Feb. 5, 1957    A. J. ALTMANN    2,780,001
COMBINATION CUTTER AND ATTACHMENT
Filed Nov. 26, 1954
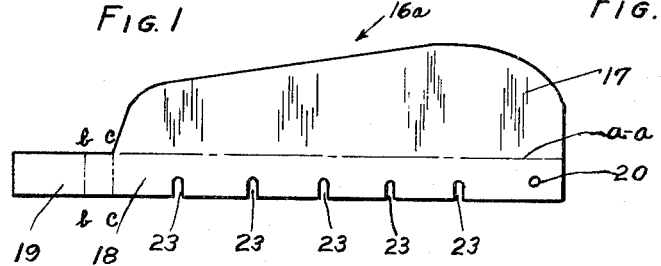
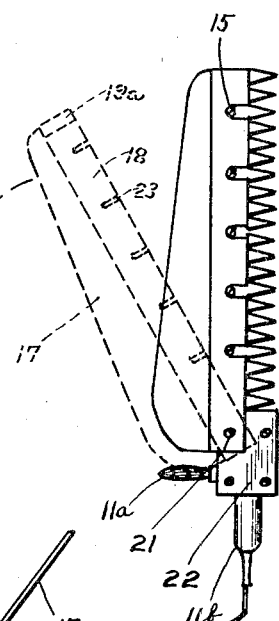
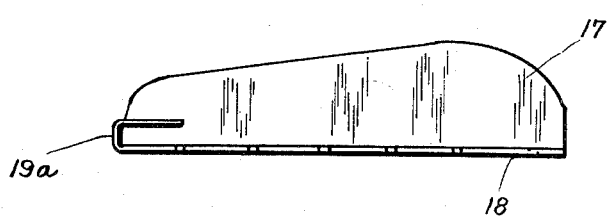
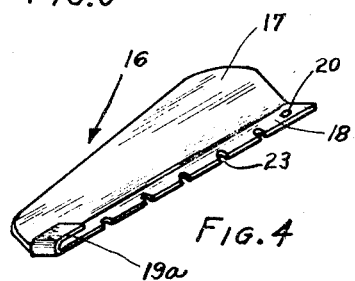
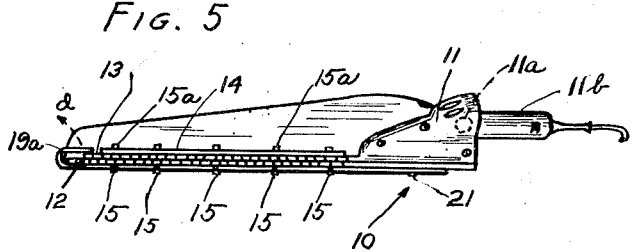
INVENTOR.
ANDREW J. ALTMANN
BY
Arthur F. Fattibene
ATTORNEY United States Patent Office 2,780,001
Patented Feb. 5, 1957

2,780,001

COMBINATION CUTTER AND ATTACHMENT

Andrew J. Altmann, Washington, D. C.

Application November 26, 1954, Serial No. 471,404

8 Claims. (Cl. 30—132)

This invention relates to a cutter and an attachment therefor and more specifically to an electric hedge trimmer and an attachment for sweeping or raking a hedge, or the like, clear of the cut foliage as the cutter trims a path across the hedge.

Heretofore, cutters such as a hedge trimmer, and the like, have been provided with collecting pans or catchers to collect the clippings, and the like, but such attachments have not proven very practical in that they are bulky, relatively heavy, and render the operation of the cutter or trimmer difficult. Also, the mode of securing the attachment to the cutter required the adjustment of the cutting blades to be disturbed. In addition, the prior devices were relatively complex, and expensive to manufacture, pack and ship.

Therefore, an object of this invention is to overcome the above disadvantages by providing a cutter or trimmer with a relatively simple, inexpensive, light-weight, practical attachment in the form of a sweep whereby the cut foliage or cuttings, and the like, are carried forward and disposed as the cutter cuts a path across a hedge, or the like.

Another object of the invention is to provide a reciprocating cutter with an attachment which is readily attachable or detachable thereto without affecting the adjustment of he cutting blades.

These objects are accomplished by providing a cutter having reciprocating cutting edges, such as in an electric hedge cutter, and the like, with an attachment made from a blank of thin-gauge, light-weight material, such as aluminum or sheet stainless steel, and the like. The attachment is readily formed by bending a substantially rectangular blank to form an angled sweep attachment substantially as shown, one leg of the sweep being provided with a tab or clip portion and a plurality of spaced apertures wherein the clip portion and a fastener through one of the apertures secures the sweep to the bottom portion of the cutter. The other spaced apertures form recesses for accommodating the fasteners which maintain the cutting blades of the cutter in proper adjusted relationship.

A feature of this invention resides in the provision of a cutter having a relatively simple, light-weight, thin-gauge sweep attached thereto which is not bulky and renders the cutter easy to operate.

Another feature of this invention resides in the provision of an attachment for a cutter that is relatively simple and inexpensive to manufacture.

Another feature of this invention resides in the provision of a sweep attachment that is pivotally mounted on a cutter to facilitate cleaning of the cutter blades by pivoting the sweep away from the cutting edges of the blades without affecting the adjustment of the cutting blades.

Another feature of this invention resides in the provision of the cutter and an attached sweep that requires no additional packing or storage space than that normally required to ship or pack a cutter, per se, that is, the cutter and attached sweep can be packed in the original cutter carton or package.

Other features and advantages will hereinafter appear:
In the drawings:
Figure 1 is a plan view of a blank required to form a sweep according to this invention.
Fig. 2 is a front view of the sweep attachment.
Fig. 3 is an end view of the sweep attachment.
Fig. 4 is a perspective view of the sweep attachment.
Fig. 5 is a front view of the cutter and attached sweep.
Fig. 6 is a bottom view of the sweep as attached to the bottom of a cutter. Dotted lines show the sweep pivoted for cleaning.

In the illustrated form of the invention there is shown a cutter 10, preferably an electric hedge clipper or cutter having reciprocating cutting blades. As shown in Figs. 5 and 6, the cutter has motor housing 11, a handle means 11a and 11b, a fixed cutting blade 12 having a saw-like cutting edge, an upper reciprocating cutting blade 13 also provided with a saw-toothed cutting edge, and a bar 14 cooperating with the lower cutting blade to maintain the upper reciprocating blade 13 therebetween. The bar 14 and the lower cutting blade 12 are maintained relatively stationary to one another by means of a plurality of bolts 15, or the like, extending through aligned apertures in the upper and lower cutting blades and the bar, and secured by nuts 15a, or the like, the reciprocating blade 13 being provided with elongated slots through which the fastener or bolt 15 extends so that it can reciprocate relative to the lower cutting blade 12. It should be noted that the bolt fasteners 15 maintain the cutting blades in proper adjustment to insure the most efficient cutting relationship; that is to say, the tightness between the upper and lower blades is set by the nut and bolts 15a and 15 respectively during manufacture of the cutter.

Therefore, an important aspect of this invention is to provide a sweep attachment 16 for the cutter which can be readily attached thereto without affecting the blade adjustment. This is accomplished by forming a sweep from a metal blank 16a, Fig. 1, of light-weight material such as aluminum alloy, or the like. Although the shape and size of the blank may vary, an illustrated form of the invention provides that a substantially rectangular blank, as shown in Fig. 1, is suitable to form a sweep according to this invention. As shown, the blank is folded or bent along fold line a—a substantially as shown in Figs. 3 and 4. This bend forms a sweep attachment having substantially a back portion 17 and a mounting portion 18 having a tab 19 extending beyond the edge of the back portion. The tab is adapted to be bent along lines b—b and c—c substantially 90 degrees to the plane of the bend lines to form a clip-like portion 19a as shown in Figs. 4 and 5. Adjacent the opposite end of the mounting portion is an aperture 20 for receiving a fastener 21 for mounting the sweep to a cutter.

As shown in Fig. 6, the sweep is pivotally mounted to the base plate 22 of the cutter. The fastener or bolt 21 securing the base plate of the cutter to the motor housing also pivotally secures the sweep to the cutter. It will be noted that the base plate fastener 21 is not one of the fasteners which maintain the cutting blades in proper adjusted relationship. Thus it will be seen that the sweep is readily adapted to the cutter by removing the base fastener 21, aligning the aperture 20 of the mounting portion 18 with the fastener hole in the base plate 22 and securing the sweep 16 thereto by the base fastener or anchor bolt 21. The other end of the mounting portion is frictionally secured to the cutter by the clip portion 19a as shown in Fig. 5.

For cleaning the cutting blades after use, or for any other reason, it is only necessary to bend the clip portion 19a upwardly as shown by the arrow d in Fig. 5 and pivoting the sweep as shown in Fig. 6.

In order to avoid affecting the adjusted relationship or tightness between the cutting blades 12 and 13, the mounting portion 18 is provided with a plurality of spaced open-end apertures 23 which are adapted to form recesses for the fasteners 15 when the sweep is pivoted in operative position as shown by the solid line in Fig. 6. Thus it will be seen that the sweep is securely mounted to the cutter by only one fixed fastener 21, and a friction securing clip 19a, the fasteners 15 remaining undisturbed. If desired, the sweep can be permanently fixed to the cutter by projecting the fasteners 15 through spaced round apertures, or the like, in the mounting portion, in which case the clip portion may be eliminated.

According to this invention, the cutter and the attached sweep is light in weight, sturdy, efficient and renders the device easy to use. Thus as the cutter mows a path across a hedge row, the cut foilage is raked or swept forward by the sweep and carried along therewith to be subsequently disposed of as the cutter approaches an edge of a hedge row. The device is especially efficient if large sweeping arcuate movements are used in cutting a hedge row. By using such arcuate movements, the sweep attachment can substantially rake the top of a row of hedges clear of the cut foilage on each pass of the cutter. Thus, the clippings are cleared immediately upon the cutting thereof, thereby eliminating the necessity of removing the cuttings by a subsequent raking operation. As a result of this invention, the time required to cut and rake the clippings is reduced to half that previously required, since both cutting and raking can be simultaneously performed.

Variations and modifications may be made within the scope of the claims and portions of the improvements may be used without others.

I claim:

1. In combination with a hedge cutter having reciprocating cutting blades, a sweep comprising a light-weight single sheet of material having a mounting portion provided with an aperture adjacent one end thereof and a clip portion at the other end thereof, said mounting portion being secured at one end to the cutter by a fastener extending through the aperture and by the clip portion clamping the cutter at the other end.

2. In combination with an electric hedge cutter having an anchor plate secured to a handle by fastening means, a sweep having a back portion and a mounting portion angularly offset therefrom and provided with an aperture at one end and a clip portion on the other end thereof, said mounting portion being secured to the cutter to the base plate by the fastener projecting through the aperture and the clip portion frictionally engaging the end of the cutter.

3. In combination with a hedge cutter having a pair of reciprocating blades, a plurality of fasteners longitudinally spaced along the blades to maintain said blade in proper reciprocating relationship and an anchor bolt; a sweep extending substantially the length of the blades comprising a back portion and a mounting portion angularly offset therefrom, said mounting portion being provided with a plurality of spaced apertures adapted to be aligned with the said fasteners, said apertures being slightly larger than the dimensions of said fasteners so that the said apertures form enlarged recesses for freely accommodating said fasteners without removing or disturbing the fasteners so as not to affect a preset blade adjustment when the sweep is secured to the cutter by the anchor bolt so that the cuttings may be raked and carried along by the sweep as the cutter cuts a path across a hedge during trimming thereof.

4. A sweep adapted to be secured to a hedge cutter comprising a single sheet of thin-gauge, light-weight material having a substantially horizontally-extending mounting portion and an inclined back portion continuous therewith, said mounting portion having an aperture adjacent one end thereof adapted for receiving a fastener and a tab extending beyond the edge of the back portion adjacent the opposite end thereof, said tab being adapted to be bent approximately 180 degrees onto itself to form a clip portion for frictionally securing the said sweep to a cutter.

5. A sweep adapted to be secured to an electric hedge cutter comprising a single sheet of thin-gauge light-weight material having a substantially horizontal mounting portion and an inclined back portion continuous therewith and provided with an aperture adjacent one end thereof for receiving a fastener to pivotally secure said sweep to the cutter a clip portion adjacent the opposite end thereof and adapted to frictionally secure the sweep to a cutter, and a plurality of open-end slots spaced along said mounting portion between said aperture and said clip, wherein said slots render said sweep adaptable to electric hedge cutters having reciprocating cutting blades without disturbing the adjustment of the cutting blades.

6. A sweep adapted to be secured to an electric hedge cutter comprising a single sheet of thin-gauge, light-weight material having a substantially horizontal mounting portion and a back portion, said mounting portion being provided with a plurality of apertures adapted to be aligned with the adjustment fasteners of a hedge cutter, said apertures having an open end so that the said sweep may be adapted to be readily attached or detached from the cutter without affecting the adjustment of the cutter blades.

7. A sweep adapted to be secured to a hedge trimmer for sweeping hedge clippings from the top of a row of hedges during the trimming thereof, comprising a sheet of thin-gauge, light-weight material having a back portion, a mounting portion angularly offset therefrom and formed continuous therewith, a plurality of spaced apertures longitudinally spaced along said mounting portion, said apertures being open at one end thereof to facilitate removal of the sweep from a cutter without affecting the adjustment of the cutter, and a tab portion forming a clip for frictionally securing said sweep to a cutter.

8. A hedge cutter comprising a pair of elongated reciprocating cutting blades, a plurality of fastening means longitudinally spaced along the said blades for maintaining said blades in proper reciprocating relationship, an anchor bolt and a sweep secured to said blades so that the said sweep may rake the clippings from the top of a row of hedges during the trimming thereof; said sweep being formed of a thin-gauge, light-weight material having a back portion and a mounting portion continuous therewith, an aperture adjacent one end of the mounting portion and adapted to receive the anchor bolt of the cutter for pivotally securing the sweep to the cutter to facilitate cleaning, a plurality of open-end apertures spaced along the longitudinal axis of said mounting portion and adapted to be aligned with the said fastening means, said open-end apertures providing a recess for accommodating said fastening means so that the sweep may be secured to the cutter without affecting the adjustment of the blades, and a clip portion on the other end of the mounting portion frictionally engaging the cutter so that only the clip portion and anchor bolt removably secure the sweep to the cutter.

References Cited in the file of this patent

UNITED STATES PATENTS

| | | |
|---|---|---|
| 299,034 | Stone | May 20, 1884 |
| 442,035 | Fox | Dec. 2, 1890 |
| 877,658 | Mattress | Jan. 28, 1908 |
| 2,281,189 | Wright | Apr. 28, 1942 |
| 2,510,311 | Greene | June 6, 1950 |

FOREIGN PATENTS

| | | |
|---|---|---|
| 9,810 | Great Britain | 1912 |